(12) United States Patent
Wang

(10) Patent No.: US 10,490,861 B2
(45) Date of Patent: Nov. 26, 2019

(54) METHOD AND ELECTRIC DEVICE FOR PREVENTING BATTERY FROM EXPANDING

(71) Applicant: GETAC TECHNOLOGY CORPORATION, Hsinchu County (TW)

(72) Inventor: Chun-Chi Wang, New Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 632 days.

(21) Appl. No.: 15/098,279

(22) Filed: Apr. 13, 2016

(65) Prior Publication Data

US 2017/0179540 A1 Jun. 22, 2017

Related U.S. Application Data

(60) Provisional application No. 62/270,143, filed on Dec. 21, 2015.

(51) Int. Cl.
*H01M 10/42* (2006.01)
*H01M 10/48* (2006.01)

(52) U.S. Cl.
CPC ....... *H01M 10/425* (2013.01); *H01M 10/486* (2013.01); *H01M 2010/4271* (2013.01); *H01M 2200/10* (2013.01); *H01M 2220/30* (2013.01)

(58) Field of Classification Search
CPC .......................... H01M 10/425; H01M 10/42

USPC ........................................................... 429/50
See application file for complete search history.

(56) References Cited

U.S. PATENT DOCUMENTS

| | | | |
|---|---|---|---|
| 8,301,873 B2* | 10/2012 | Chiu | G06F 1/206 710/260 |
| 9,455,436 B2* | 9/2016 | Roh | H01M 2/34 |
| 2011/0131400 A1* | 6/2011 | Chiu | G06F 1/203 713/2 |
| 2013/0071718 A1* | 3/2013 | Cho | F28F 21/084 429/120 |
| 2014/0127549 A1* | 5/2014 | Roh | H01M 2/34 429/150 |
| 2014/0248523 A1* | 9/2014 | Roh | H01M 2/34 429/121 |
| 2016/0064780 A1* | 3/2016 | Jarvis | H01M 10/4257 429/50 |
| 2016/0172657 A1* | 6/2016 | Matsui | H01M 2/345 429/61 |

FOREIGN PATENT DOCUMENTS

| CN | 101714766 A | 5/2010 |
|---|---|---|
| CN | 102082310 A | 6/2011 |

* cited by examiner

*Primary Examiner* — Abdullah A Riyami
*Assistant Examiner* — Nader J Alhawamdeh

(57) ABSTRACT

A method for preventing battery from expanding is applied to awake an embedded controller to measure variations of a temperature and a storage capacity of a battery module of an electric device at a preset frequency to timely control the battery module to discharge when the electric device is in an off-state, so as to prevent the battery module from expanding and deforming.

16 Claims, 4 Drawing Sheets

METHOD AND ELECTRIC DEVICE FOR PREVENTING BATTERY FROM EXPANDING

BACKGROUND OF THE INVENTION

Field of the Invention

The present invention relates to a method and an electric device for preventing battery from expanding and, more particularly, to a method and an electric device for preventing battery from expanding in an off-state.

Description of the Prior Art

The reason that portable electric devices such as mobile phones, notebooks (NBs), and personal digital assistants (PDAs) shortly became popular can be ascribed to the portability of the electric devices since the consuming power can be supplied by battery modules. Design of battery modules are turned from conventional cylindrical batteries into prismatic batteries and flat batteries. Particularly, the flat batteries are utilized mostly.

Nevertheless, when an electric device stays in a high temperature environment too long or is charged improperly, its battery module may easily expand, deform, explode, or cause other components' damage. Generally, most of electric devices include power management systems. When the electric device is in an on-state, charge-discharge operations of a batter module can be controlled by the power management system such that life of the battery module can last. However, the power management system stops its operation and has no control in an off-state.

SUMMARY OF THE INVENTION

To address the above issue, the present invention provides a method and an electric device for preventing battery from expanding to monitor a battery module to prevent the battery module from expanding and deforming in an off-state.

In an embodiment, a method for preventing battery from expanding comprises: awaking an embedded controller of an electric device at a preset frequency when the electric device is in an off-state; confirming a temperature and a storage capacity of a battery module of the electric device by the embedded controller; and activating a system power of the electric device by the embedded controller until the temperature and the storage capacity satisfy a second limit condition if the temperature and the storage capacity are greater than a first limit condition.

In an embodiment, an electric device capable of preventing battery from expanding comprises a processor, a battery module, a supplying circuit, and an embedded controller. The battery module stores a storage power. The supplying circuit is connected to the battery module and the processor. The embedded controller is connected to the processor, the battery module, and the supplying circuit. When the processor is in an off-state, the embedded controller is awaked to confirm a temperature and a storage capacity of a battery module at a preset frequency. If the temperature and the storage capacity are greater than a first limit condition, the embedded controller controls the supplying circuit to output a system power based on the storage power until the temperature and the storage capacity satisfy a second limit condition.

In summary, according to the method and the electric device for preventing battery from expanding of the embodiments of the present invention, the electric device can awake the embedded controller to measure variations of the temperature and the storage capacity of the battery module at a preset frequency to timely control the battery module to discharge when the electric device is in the off-state so as to prevent the battery of the electric device in the off-state from expanding.

DETAILED DESCRIPTION OF THE EMBODIMENTS

Figure 1:
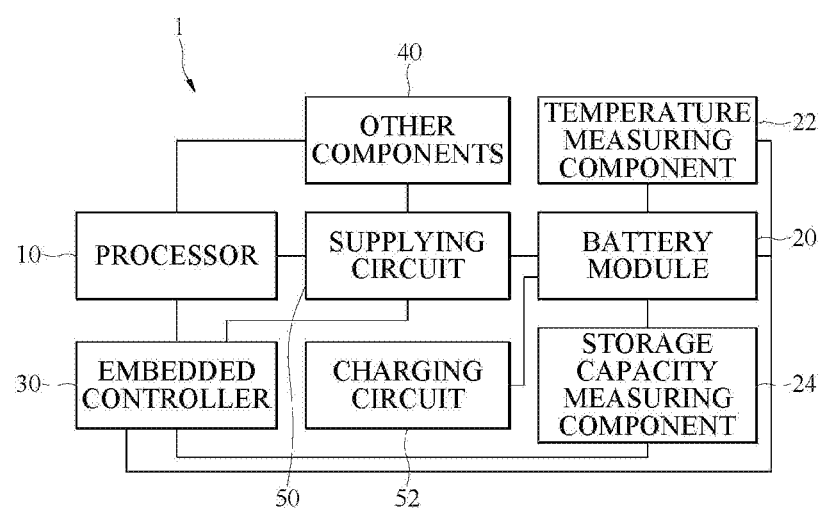
FIG. 1 illustrates a block diagram of an electric device capable of preventing battery from expanding according to an embodiment of the present invention.

FIG. 1 is a block diagram of an electric device capable of preventing battery from expanding according to an embodiment of the present invention. In an embodiment, referring to FIG. 1, the electric device 1 comprises a processor 10, a battery module 20, other components 40, a supplying circuit 50, and an embedded controller (EC) 30.

The processor 10 is electrically connected to the embedded controller 30, other components 40, and the supplying circuit 50. The battery module 20 is electrically connected to the supplying circuit 50. The supplying circuit 50 is electrically connected to the embedded controller 30 and other components 40.

The battery module 20 is for storing storage power. In an operation state of the electric device 1 (i.e., the processor 10 is in the operation state to execute an operating system), the supplying circuit 50 provides required power to each component of the electric device 1 (e.g., the processor 10, other components 40, and the embedded controller 30) based on the storage power. One of characteristics of the present invention is that when the electric device 1 is in an off-state (i.e., the processor 10 is in the off-state), the embedded controller 30 is awaked to confirm a temperature and a storage capacity of the battery module 20 at a preset frequency and timely controls the supplying circuit 50 to output system power (i.e., discharging the battery module 20) based on the storage power. The temperature of the battery module 20 can be the temperature itself or an environmental temperature from the periphery of the battery module 20. The storage capacity of the battery module 20 can be represented by percentage of full capacity of the battery.

In some embodiments, the electric device 1 can further comprise a temperature measuring component 22 and a storage capacity measuring component 24. The temperature measuring component 22 is electrically connected to the battery module 20 and the embedded controller 30. The storage capacity measuring component 24 is electrically connected to the battery module 20 and the embedded controller 30. The temperature measuring component 22 is for measuring a present temperature of the battery module 20. The storage capacity measuring component 24 is for measuring a present storage capacity of the battery module 20.

In some embodiments, the electric device 1 can count time in the off-state by a timer (not shown). When a counted time counted by the timer reaches a preset counted time, the timer outputs an awaking signal to awake the embedded controller 30. In some embodiments, the timer is outside the embedded controller 30 and is electrically connected to the embedded controller 30. Alternatively, the timer can be integrated with the embedded controller 30.

In some embodiments, the timer can be electrically connected to the temperature measuring component 22 and the storage capacity measuring component 24. When the counted time counted by the timer reaches the preset counted time in the off-state, the timer also outputs awaking signals to the temperature measuring component 22 and the storage capacity measuring component 24 to awake the temperature measuring component 22 and the storage capacity measuring component 24 to perform measurement. In other embodiments, the embedded controller 30 drives the temperature measuring component 22 and the storage capacity measuring component 24 to perform measurement in the off-state after the embedded controller 30 is awaked.

In some embodiments, operating power required by the timer can be supplied by the battery module 20 through another supplying circuit such that the timer can count time when the electric device 1 is in the off-state. In other embodiments, the electric device can have a built-in reserve supply module. The reserve supply module can supply power required by the timer in the off-state.

In some embodiments, the embedded controller 30 is switched to a low power mode in the off-state. Meanwhile, minimum power required by the embedded controller 30 (lower than the power required by the embedded controller 30 being awake) can be supplied by the battery module 20 or the reserve supply module.

In some embodiments, the electric device 1 can further comprise a charging circuit 52. The charging circuit 52 is electrically connected to the embedded controller 30 and the battery module 20. The charging circuit 52 can also be electrically connected to an external power supply outside the electric device 1 (e.g., being connected to the supply mains through a transformer). The charging circuit 52 can charge the battery module 20 by the external power supply. In other words, the charging circuit 52 can input, based on the external power supply, charging power to the battery module 20 as the storage power.

In some embodiments, the electric device 1 can be a notebook, a tablet, a smart phone, a working table, a server, or a medical instrument. The processor 10 can be a micro processor, a micro controller, a digital signal processor, a micro calculator, or a central processing unit (CPU). The operating system can be Microsoft Windows operating system, Linux operating system, MAC OS operating system, or mobile operating system (Mobile OS) such as Android operating system, Mango operating system, iOS operating system, Tango operating system, and Apollo operating system.

In some embodiments, the embedded controller 30 can comprise a built-in storage unit or can be connected to an external storage unit. The storage unit stores required parameters for operation (e.g., a first limit condition and a second limit condition).

In some embodiments, other components 40 can be components assisting the electric device 1 with functional operation. If the electric device 1 is a notebook, for instance, other components 40 can be one or combination of a motherboard, a cooling fan, a display card, a sound card, a wireless chip, a hard drive, a monitor, and a user interface.

Figure 2:
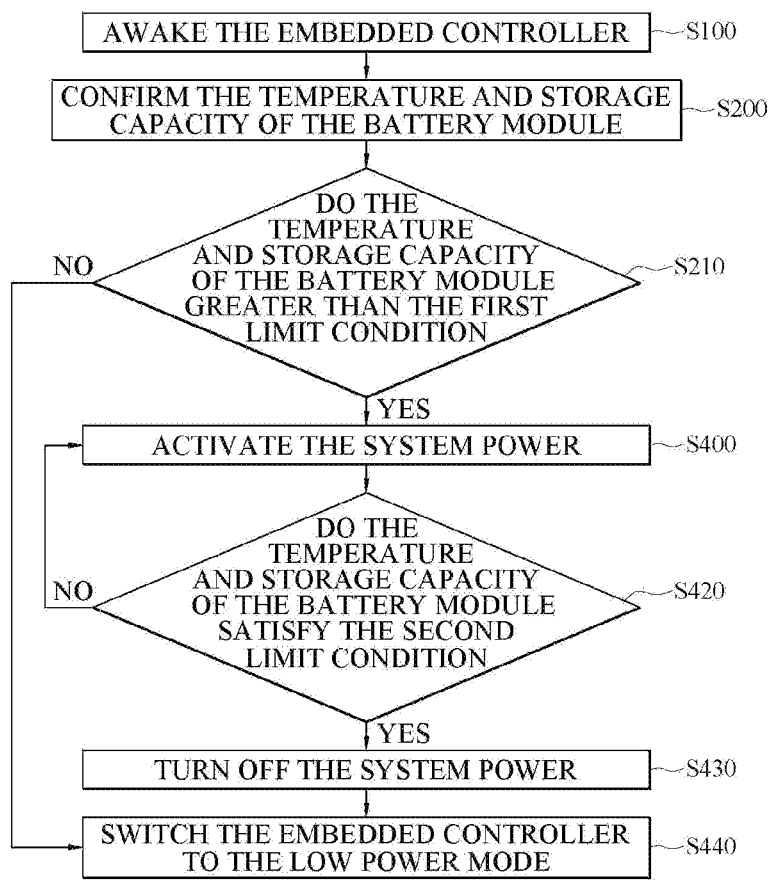
FIG. 2 illustrates a flow chart of a method for preventing battery from expanding according to an embodiment of the present invention.

FIG. 2 is a flow chart of a method for preventing battery from expanding according to an embodiment of the present invention. Referring to FIG. 1 and FIG. 2, the embedded controller 30 is awaked at a preset frequency (step S100) when the electric device 1 is in the off-state. For instance, the embedded controller 30 is awaked periodically at a preset interval. The preset interval can be 5 to 30 minutes. The preset interval can be determined by an expected use environment of the electric device 1 and/or characteristics of the battery module 20 of the electric device 1. For instance, if the electric device 1 is expected to be used in an enclosed and poorly-ventilated environment (e.g., a kitchen of a restaurant or a mine in which the temperature is relative high), the preset interval can be set shorter and, consequently, the embedded controller 30 is awaked more frequently. In contrast, the preset interval can be set longer if the electric device 1 is expected to be used in a usual environment (e.g., an office or a residence), and, consequently, the embedded controller 30 is not awaked frequently. The present invention is not limited to the aforementioned embodiments.

After the embedded controller 30 is awaked, the embedded controller 30 confirms the temperature and the storage capacity of the battery module 20 (step S200). The embedded controller 30 receives/reads the present temperature of the battery module 20 measured by the temperature measuring component 22 and the present storage capacity of the battery module 20 measured by the storage capacity measuring component 24. Moreover, the embedded controller 30 compares the first limit condition with the received temperature and the received storage capacity to confirm/determine whether the temperature and the storage capacity of the battery module 20 are greater than the first limit condition (step S210). In some embodiments, the first limit condition comprises a first threshold value with respect to temperature and a second threshold value with respect to storage capacity. The embedded controller 30 compares the received temperature of the battery module 20 with the first threshold value and compares the received storage capacity of the battery module 20 with the second threshold value to determine whether the received temperature and the received storage capacity of the battery module 20 are both higher than the respective, corresponding threshold values (the first threshold value and the second threshold value). In other words, the satisfaction of the first limit condition is that the temperature of the battery module 20 is greater than or equal to the threshold value with respect to temperature and, simultaneously, the storage capacity of the battery module 20 is greater than or equal to the threshold value with respect to storage capacity.

In some embodiments, the first threshold value can be 55° C. (55 degrees Celsius), and the second threshold value can be 80% of full capacity of the battery module 20. In other words, the satisfaction of the first limit condition is that the temperature of the battery module 20 is greater than or equal to 55° C. and the storage capacity of the battery module 20 is greater than or equal to 80% of full capacity of the battery module 20.

When the embedded controller 30 confirms that the temperature and the storage capacity are greater than the first limit condition (step S210), the embedded controller 30 activates the system power of the electric device 1 (step S400). In some embodiments, the embedded controller 30 controls the supplying circuit 50 to output the system power based on the storage power of the battery module 20. Herein, outputting the system power means supplying the storage power in the battery module 20 to other components 40 and the processor 10. That is to say, the storage capacity of the battery module 20 can be lower by activating the supplying circuit 50 to supply power so as to consume the storage power in the battery module 20.

After activating the system power (during the discharging process of the battery module 20), the embedded controller 30 determines whether the temperature of the battery module 20 and the storage capacity of the battery module 20 satisfy the second limit condition (step S420). In some embodiments, the second limit condition comprises a third threshold value with respect to temperature and a fourth threshold value with respect to storage capacity. After activating the system power (during the discharging process of the battery module 20), the embedded controller 30 compares the present temperature of the battery module 20 with the third threshold value and compares the present storage capacity of the battery module 20 with the fourth threshold value repeatedly to determine whether one of the present temperature and the present storage capacity of the battery module 20 is lower than or equal to the corresponding threshold value (the third threshold value or the fourth threshold value). In other words, the satisfaction of the second limit condition is that the temperature of the battery module 20 is less than or equal to the third threshold value, or the storage capacity of the battery module 20 is less than or equal to the fourth threshold value.

In some embodiments, the third threshold value can be 50° C. (50 degrees Celsius), and the fourth threshold value can be 50% of full capacity of the battery module 20. In other words, the satisfaction of the second limit condition is that the temperature of the battery module 20 is less than or equal to 50° C., or the storage capacity of the battery module 20 is less than or equal to 50% of full capacity of the battery module 20.

The settings of the first limit condition and the second limit condition can be adjusted depending on, but not limited to, environmental temperature of the place at which the electric device 1 locates and the characteristics of the battery module 20 (e.g., sensitivity to the variation of temperature).

When the embedded controller 30 confirms that the present temperature and the present storage capacity of the battery module 20 satisfy the second limit condition, that is to say, the embedded controller 30 confirms that one of the temperature and the storage capacity is lower than or equal to the corresponding threshold value (the third threshold value or the fourth threshold value), the embedded controller 30 turns off the system power (step S430) and is switched to the low power mode (step S440). Turning off the system power means that the embedded controller 30 controls the supplying circuit 50 to stop outputting the storage power in the battery module 20. The embedded controller 30 being switched to the low power mode means that the embedded controller 30 returns to a setting state such as a hibernate state (or a standby state).

Figure 3:
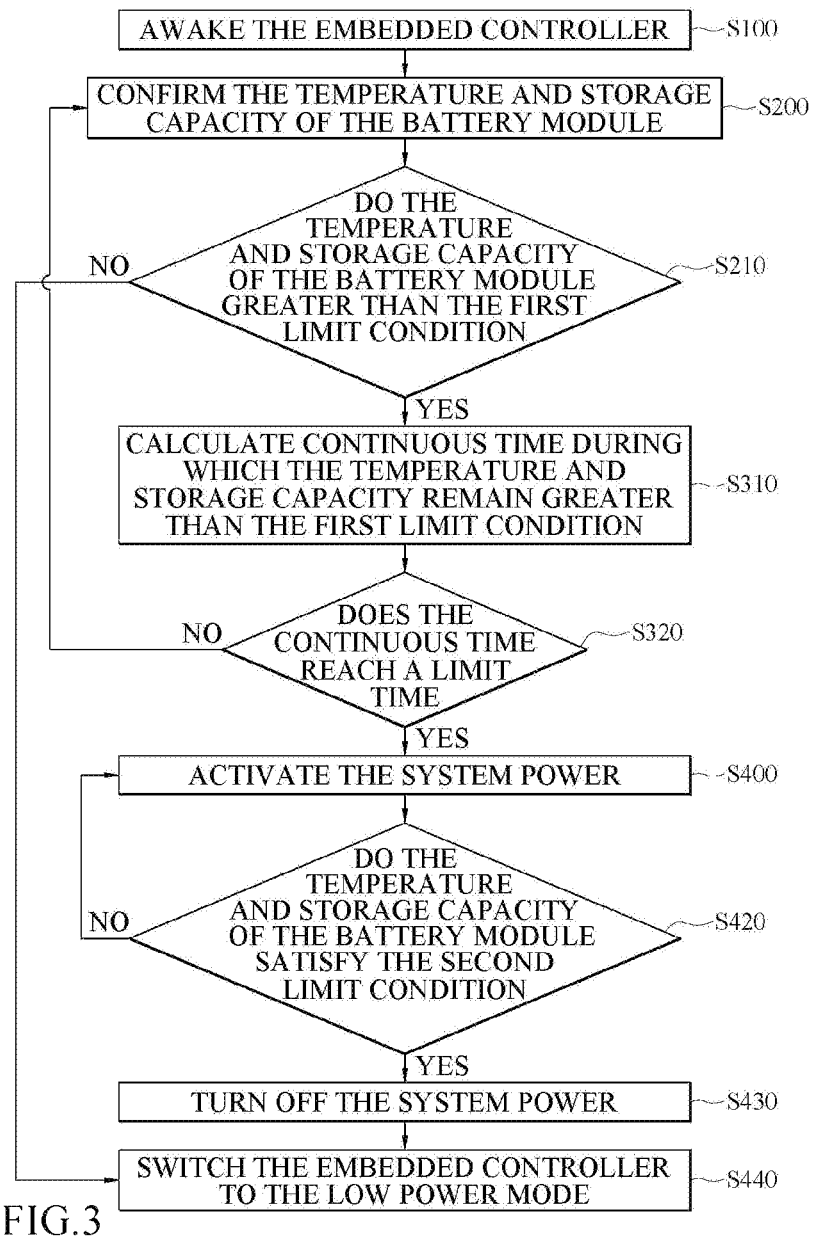
FIG. 3 illustrates a flow chart of a method for preventing battery from expanding according to another embodiment of the present invention.

FIG. 3 is a flow chart of a method for preventing battery from expanding according to another embodiment of the present invention. Referring to FIG. 3, in some embodiments, when the temperature and the storage capacity are greater than the first limit condition (step S210), the embedded controller 30 can start to count time to calculate continuous time during which the temperature and the storage capacity remain greater than the first limit condition (step S310) in advance and determine whether the continuous time reaches a limit time (step S320).

If the continuous time reaches the limit time, the embedded controller 30 controls the supplying circuit 50 to output the system power based on the storage power (step S400) to start discharging the battery module 20. If the continuous time does not reach the limit time, the embedded controller 30 keeps confirming the present temperature and the present storage capacity of the battery module 20 (returns to step S200) to keep confirming whether the present temperature and the present storage capacity of the battery module 20 are greater than the first limit condition (or the embedded controller 30 keeps waiting until the temperature and the storage capacity are greater than the first limit condition) until the continuous time during which the temperature and the storage capacity are greater than the first limit condition reaches the limit time or one of the temperature and the storage capacity is not greater than the first limit condition. As a result, shortening of the life of battery module 20 due to misjudgments or frequently discharges can be avoided. In some embodiments, when the embedded controller 30 determines that the temperature and the storage capacity of the battery module 20 are greater than the first limit condition, the embedded controller 30 activates a timer (not shown) to start counting time. The embedded controller 30 resets (zeros) the timer when determining that one of the temperature and the storage capacity of the battery module 20 is not greater than the first limit condition. When the counted time (i.e., the aforementioned continuous time) of the timer reaches the limit time, the timer returns a triggering signal to the embedded controller 30, and then the embedded controller 30 activates the system power of the electric device 1 in response to the triggering signal.

In other words, if the temperature only raises temporarily, the embedded controller 30 remains an awake state to keep monitoring variations of the temperature and the storage capacity without any controlling and does not switch to the low power mode, either.

In some embodiments, the limit time can be adjusted depending on variation of environmental temperature and characteristics of the battery module 20, e.g., depending on the probability that the battery module 20 expands and deforms in a high temperature state. Suppose that the battery module 20 keeps staying in a high temperature state over 3 minutes, the probability that the battery module 20 expands and deforms is less than 10%, and suppose that the battery module 20 keeps staying in the high temperature state over 10 minutes, the probability that the battery module 20 expands and deforms is greater than 50%. If the probability being less than 10% is an acceptable risk, the limit time can be set to 10 minutes.

In some embodiments, if the embedded controller 30 confirms that one of the temperature and the storage capacity of the battery module 20 is not greater than the first limit condition, the embedded controller 30 does not switch to the low power mode immediately but remains the awake state to monitor the temperature and the storage capacity again. If the embedded controller 30 continuously confirms a number of times that one of the temperature and the storage capacity of the battery module 20 is not greater than the first limit condition and the number of times reaches a preset number, the embedded controller 30 switches to the low power mode (step S440). The preset number can be 2 to 10 (times).

Figure 4:
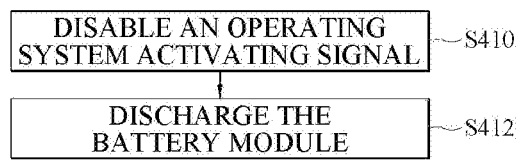
FIG. 4 illustrates a detailed flow chart of step S400 of FIG. 2 or FIG. 3 according to an embodiment.

FIG. 4 is a detailed flow chart of step S400 of FIG. 2 or FIG. 3 according to an embodiment. Referring to FIG. 1 to FIG. 4, in some embodiments of step S400, after the temperature and the storage capacity are greater than the first limit condition (step S210) or after the continuous time reaches the limit time (step S320), the embedded controller 30 is disabled from transmitting an operating system activating signal to the processor 10 of the electric device 1 (step S410) to force the electric device 1 to remain in the off-state (i.e., the processor 10 does not execute/enter the operating system). Then, while the electric device 1 is forced to remain in the off-state, the embedded controller 30 activates the system power of the electric device 1 to have the battery module 20 discharged (step S412).

Normally (i.e., transmission of the operating system activating signal to the processor 10 of the electric device 1 is not disabled), when the electric device 1 starts up, the embedded controller 30 confirms that all components of the electric device 1 are fully supplied, and then the embedded controller 30 transmits the operating system activating signal to the processor 10, so as to have the processor 10 execute the operating system in response to the operating system activating signal, i.e., to have the electric device 1 switched to an on-state.

Figure 5:
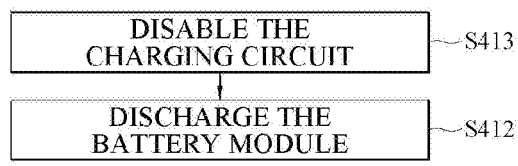
FIG. 5 illustrates a detailed flow chart of step S400 of FIG. 2 or FIG. 3 according to another embodiment.

FIG. 5 is a detailed flow chart of step S400 of FIG. 2 or FIG. 3 according to another embodiment. Referring to FIG. 1 to FIG. 3 and FIG. 5, in some embodiments of step S400, after the temperature and the storage capacity are greater than the first limit condition (step S210) or after the continuous time reaches the limit time (step S320), the embedded controller 30 directly disables the charging circuit 52 to stop the charging circuit 52 from transmitting the charging power to the battery module 20 (step S413). After the charging circuit 52 is disabled, the embedded controller 30 activates the system power of the electric device 1 to have the battery module 20 discharged (step S412).

It should be noted that although the aforementioned steps are described in certain sequence, the present invention shall not be limited by the sequence. People in the art should understand parts of the steps can be performed in reverse sequence or can be performed simultaneously in reasonable condition. For example, the sequence of step S412 and step S413 has no limitation. Step S413 can be prior to step S412, or step S412 can be prior to step S413. Alternatively, step S413 and step S412 can be performed simultaneously.

Concisely, according to the method for preventing battery from expanding adapted to an electric device and the electric device of the embodiments of the present invention, the electric device can awake the embedded controller to measure variations of the temperature and the storage capacity of the battery module at a preset frequency to timely control the battery module to discharge when the electric device is in the off-state so as to prevent the battery of the electric device in the off-state from expanding.

While the present invention has been described by way of example and in terms of the preferred embodiments, it is to be understood that the present invention needs not be limited to the disclosed embodiments. For anyone skilled in the art, various modifications and improvements within the spirit of the present invention are covered under the scope of the present invention. The covered scope of the present invention is based on the appended claims.

What is claimed is:

1. A method for preventing battery from expanding, comprising:
    awaking an embedded controller of an electric device at a preset frequency when the electric device is in an off-state;
    confirming a temperature and a storage capacity of a battery module of the electric device by the embedded controller; and
    activating a system power of the electric device by the embedded controller until the temperature and the storage capacity satisfy a second limit condition if the temperature and the storage capacity are greater than a first limit condition.

2. The method for preventing battery from expanding of claim 1, if the temperature and the storage capacity are greater than the first limit condition, the method further comprising:
    starting to calculate a continuous time during which the temperature and the storage capacity remain greater than the first limit condition;
    determining whether the continuous time reaches a limit time; and
    activating the system power of the electric device by the embedded controller if the continuous time reaches the limit time.

3. The method for preventing battery from expanding of claim 2, after determining whether the continuous time reaches the limit time, the method further comprising:
    keeping waiting until the temperature and the storage capacity are greater than the first limit condition if the continuous time does not reach the limit time.

4. The method for preventing battery from expanding of claim 2, wherein the activating the system power of the electric device by the embedded controller if the continuous time reaches the limit time comprises:
    disabling the embedded controller from transmitting an operating system activating signal to a processor of the electric device to have the electric device remain in the off-state; and
    discharging the battery module in the off-state.

5. The method for preventing battery from expanding of claim 4, wherein the disabling the embedded controller from transmitting the operating system activating signal to the processor of the electric device comprises:
    determining whether the temperature and the storage capacity satisfy the second limit condition; and
    having the embedded controller turn off the system power to switch the embedded controller to a low power mode if satisfying the second limit condition.

6. The method for preventing battery from expanding of claim 1, wherein the satisfaction of the first limit condition is that the temperature is greater than or equal to 55 degrees Celsius and the storage capacity is greater than or equal to 80% of full capacity of the battery module.

7. The method for preventing battery from expanding of claim 1, wherein the satisfaction of the second limit condition is one of that the temperature is less than or equal to 50 degrees Celsius and that the storage capacity is less than or equal to 50% of full capacity of the battery module.

8. The method for preventing battery from expanding of claim 1, wherein if the temperature and the storage capacity are greater than the first limit condition, the method further comprises the step of: disabling a charging circuit by the embedded controller to stop transmission of a charging power to the battery module.

9. An electric device capable of preventing battery from expanding, comprising:
    a processor;
    a battery module for storing a storage power;
    a supplying circuit for being electrically connected to the battery module and the processor; and
    an embedded controller electrically for being connected to the processor and the supplying circuit, wherein when the processor is in an off-state, the embedded controller is awaked to confirm a temperature and a storage capacity of a battery module at a preset frequency, and if the temperature and the storage capacity are greater than a first limit condition, the embedded controller controls the supplying circuit to output a system power based on the storage power until the temperature and the storage capacity satisfy a second limit condition.

10. The electric device capable of preventing battery from expanding of claim 9, wherein if the temperature and the storage capacity are greater than the first limit condition, the embedded controller starts to calculate a continuous time during which the temperature and the storage capacity remain greater than the first limit condition, and determines whether the continuous time reaches a limit time, and if the continuous time reaches the limit time, the embedded controller controls the supplying circuit to output the system power based on the storage power.

11. The electric device capable of preventing battery from expanding of claim 10, wherein if the continuous time does not reach the limit time, the embedded controller keeps waiting until the temperature and the storage capacity are greater than the first limit condition.

12. The electric device capable of preventing battery from expanding of claim 10, wherein the embedded controller is disabled from transmitting an operating system activating signal to the processor to have the electric device remain in the off-state, and controls the supplying circuit to have the battery module discharged in the off-state.

13. The electric device capable of preventing battery from expanding of claim 12, wherein after the embedded controller is disabled from transmitting the operating system activating signal to the processor, the embedded controller further determines whether the temperature and the storage capacity satisfy the second limit condition, and if the temperature and the storage capacity satisfying the second limit condition, the embedded controller has the supplying circuit turn off the system power such that the embedded controller is switched to a low power mode.

14. The electric device capable of preventing battery from expanding of claim 9, wherein the satisfaction of the first limit condition is that the temperature is greater than or equal to 55 degrees Celsius and the storage capacity is greater than or equal to 80% of full capacity of the battery module.

15. The electric device capable of preventing battery from expanding of claim 9, wherein the satisfaction of the second limit condition is one of that the temperature is less than or equal to 50 degrees Celsius and that the storage capacity is less than or equal to 50% of full capacity of the battery module.

16. The electric device capable of preventing battery from expanding of claim 9, further comprising a charging circuit, wherein if the temperature and the storage capacity are greater than the first limit condition, the embedded controller disables the charging circuit to stop transmission of a charging power to the battery module.

* * * * *